United States Patent
Gauthier et al.

(10) Patent No.: US 7,647,761 B2
(45) Date of Patent: Jan. 19, 2010

(54) SYSTEM FOR DEICING THE NOSE CONE OF AN AIRCRAFT TURBOJET WITH OIL

(75) Inventors: Gerard Philippe Gauthier, Champagne sur Seine (FR); Laurent Gille, Dammarie les Lys (FR); Serge Rene Morreale, Guignes (FR); Jean-Yves Picart, Dammarie-les-Lys (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/029,212

(22) Filed: Feb. 11, 2008

(65) Prior Publication Data

US 2008/0190093 A1   Aug. 14, 2008

(30) Foreign Application Priority Data

Feb. 14, 2007 (FR) .................................. 07 53239

(51) Int. Cl.
*F02C 7/047* (2006.01)
*F02C 7/06* (2006.01)
(52) U.S. Cl. .................... 60/39.08; 60/39.093; 184/6.11
(58) Field of Classification Search .............. 60/39.093, 60/39.08; 184/6.11; 244/134 R
See application file for complete search history.

(56) References Cited

U.S. PATENT DOCUMENTS

| 3,528,752 A | * | 9/1970 | Davies et al. | ............... 415/130 |
| 3,757,535 A | * | 9/1973 | Stein | .......................... 184/6.11 |
| 3,834,157 A | * | 9/1974 | Hoffmann | ................ 60/39.093 |
| 3,925,979 A | * | 12/1975 | Ziegler | .................... 60/39.093 |
| 5,272,868 A | | 12/1993 | Ciokajlo et al. | |
| 2006/0081419 A1 | * | 4/2006 | Care et al. | .................. 184/6.11 |

FOREIGN PATENT DOCUMENTS

| DE | 1 281 270 | 10/1968 |
| FR | 2.216.442 | 8/1974 |
| WO | 2005/073539 A1 | 8/2005 |

* cited by examiner

*Primary Examiner*—Ted Kim
(74) *Attorney, Agent, or Firm*—Oblon, Spivak, McClelland, Maier & Neustadt, L.L.P.

(57) ABSTRACT

The turbojet has a bearing which supports, in rotation and in thrust, a low-pressure compressor shaft of axis Z-Z of the engine. The bearing is lubricated with oil by means of two nozzles. A feed tube is fastened to the nose cone of the engine. This tube connects the low-pressure compressor shaft to the engine nose cone. A skin lines the wall of the engine nose cone, leaving a passage for the circulation of oil. A plurality of radial oil return tubes are placed between the most eccentric part of the skin relative to the Z-Z axis and the bearing, for returning the oil to the bearing. The return of the oil into the bearing is located at a distance R from the Z-Z axis larger than the radius r of the feed tube.

8 Claims, 1 Drawing Sheet

SYSTEM FOR DEICING THE NOSE CONE OF AN AIRCRAFT TURBOJET WITH OIL

BACKGROUND OF THE INVENTION

The invention relates to a system for deicing the nose cone of an aircraft turbojet, said turbojet having a bearing which supports, in rotation and in thrust, a hollow low-pressure compressor shaft of axis Z-Z of the engine, said bearing being lubricated with oil by means of two nozzles.

In certain flight phases (climb, descent, approach), "icing" atmospheric conditions may be encountered if the ambient temperature becomes equal to or below zero Celsius and in the presence of supercooled water in clouds. These conditions may lead to unacceptable amounts of ice being deposited on the nose cone and require the installation of a system for deicing said nose cone.

DESCRIPTION OF THE PRIOR ART

Currently nose cones of aircraft turbojets are deiced with air. Some of the air that has been compressed, and therefore heated, in the low-pressure compressor is bled off via one or more lines. This air is injected close to the apex of the nose cone. Under the effect of the pressure, it flows along this cone between two skins, heating the cone. This has the effect of deicing it. The air then leaves the nose cone by holes formed in its base. Document U.S. Pat. No. 3,925,979 discloses a device of this type.

A device of this type has drawbacks.

The air bleed constitutes a leakage that makes the efficiency of the engine drop. This is why such a device operates only under icing conditions, that is to say intermittently. Therefore detectors and control valves have to be provided so as to stop the bleed under non-icing conditions.

Also known (from U.S. Pat. No. 3,420,311) is a bladed rotor having a hollow nose cone supported by a hub of the rotor. A duct for a pressurized liquid, for example oil, passes through the hub, and a discharge valve is positioned close to an inner surface of the nose cone in such a way that the liquid flowing from the discharge valve firstly strikes the nose cone before passing, under the effect of the centrifugal force, along the inner surface. The heat exchange between the liquid and the nose cone has the effect of heating the latter so as to prevent it from icing up.

This type of feed with pressurized oil requires sealing systems between fixed parts and rotating parts. Dynamic seals have a limited lifetime, which inevitably results in leakages. Another drawback lies in the level of oil pressure to be reached in order to open the discharge valve. Without a regulator or a pump specifically dedicated to this purpose, it appears difficult to obtain the pressure level compatible with the nose cone deicing requirement.

SUMMARY OF THE INVENTION

One subject of the present invention is a system for deicing the nose cone of an aircraft turbojet that remedies these drawbacks. This purpose is achieved by the fact that the deicing system comprises:

- a feed tube fastened to the nose cone of the engine, this tube connecting the low-pressure compressor shaft to the engine nose cone and having a radius (r);
- a skin lining the wall of the engine nose cone, leaving a passage for the circulation of oil;
- a plurality of radial oil-return tubes placed between the most eccentric part of the skin relative to the Z-Z axis and the bearing, for returning the oil to the bearing; and
- the return of the oil into the bearing being located at a distance R from the Z-Z axis larger than the radius r of the feed tube.

Thanks to these features:

- there is no air bleed at the compressor outlet, so that the efficiency of the engine is improved. The specific fuel consumption saving is 0.16% under icing conditions, as there is no loss of performance due to air bleeds from the compressor;
- the oil circulates permanently, whether the external conditions are icing or not. Consequently, it is unnecessary to provide means for starting and stopping the deicing system. In particular, it is unnecessary to provide regulating valves, thereby simplifying the device and saving weight;
- a lubricating oil is cooled—the operating temperature of the bearing is therefore lowered;
- there is no oil specifically dedicated to the deicing function—the feed pump is therefore unchanged;
- the return of the deicing oil takes place via the front chamber—there is therefore no pollution; and
- the air/oil pair provides better heat exchange than the air/air pair since the physical characteristics of the oil are superior to those of air.

In a preferred embodiment, the low-pressure compressor shaft has an even number of slots separated by an even number of inter-slot spaces, the nozzles being directed toward the slots and toward the nose cone so that the oil jet from the nozzles can pass through them, the nozzles being placed relative to these slots in such a way that one of the nozzles starts to eject oil into a slot at the moment when the jet from the other nozzle starts to be reflected by an inter-slot space.

Thanks to these features, the bearing is continuously fed with oil and, likewise, the deicing system is continuously fed with oil.

Advantageously, the angle of inclination of the nozzle relative to the Z-Z axis of the low-pressure compressor shaft is between 5° and 30°.

Also advantageously, the feed tube has a conicity of between 0° and 2°, the largest-diameter portion of the cone being located on the engine nose cone side.

Advantageously, the feed tube includes a projection in its part located toward the low-pressure compressor shaft.

According to one particular embodiment, the deicing system includes a centrifugal scoop, the function of which is to recover the oil that has been reflected by the inter-slot spaces of the low-pressure shaft and to direct this oil toward the bearing.

Should the oil flow rate in the space dedicated to deicing the nose cone be less than the flow rate from a nozzle, the oil spills over the projection and rejoins the centrifugal scoop under the effect of the centrifugal force.

Thus, under particular operating conditions, for example should the viscosity of the oil become high because of very low temperatures, the device allows the bearing to be cooled without any oil deficit.

According to another aspect, the invention relates to an aircraft turbojet that includes a system for deicing its nose cone with oil in accordance with the present invention.

Other features and advantages of the invention will become more apparent on reading the following description of an exemplary embodiment given purely by way of illustration and with reference to the appended drawings.

DESCRIPTION OF THE PREFERRED EMBODIMENTS

Figure 1:
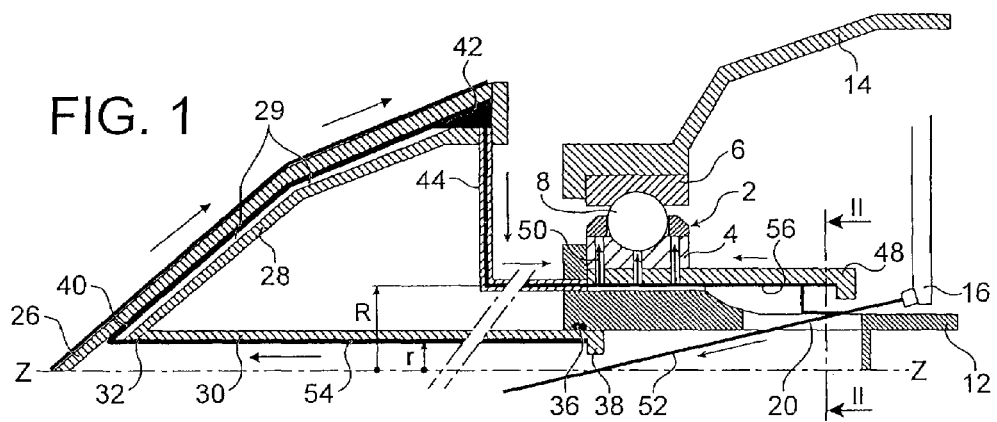
FIG. 1 is a schematic sectional view of a deicing system according to the present invention.

In FIG. 1, the reference 2 denotes a ball bearing. It comprises an inner race 4, an outer race 6 and balls 8. It has a rotation axis Z-Z which is at the same time an axis of symmetry. The reference 12 denotes the low-pressure shaft of the turbojet. The inner race 4 of the ball bearing 2 is mounted on the low-pressure shaft 12, while the outer race 6 of this ball bearing is mounted on a casing 14.

Figure 2:
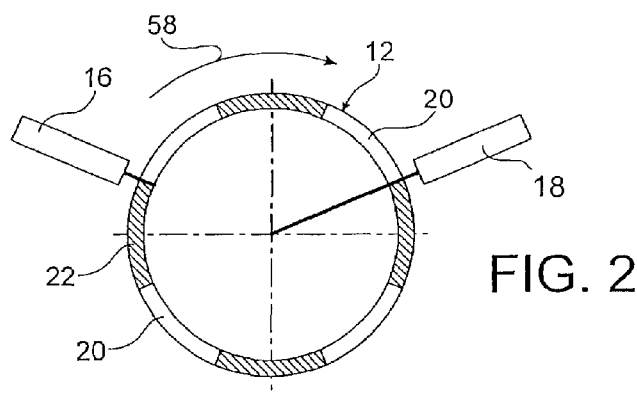
FIG. 2 is a schematic sectional view on the line II-II of FIG. 1.

To feed the bearing 2 with lubricating and cooling oil, two nozzles 16 and 18 are provided (see FIG. 2). Slots 20 are formed in the low-pressure shaft 12. There is an even number of these slots, 4 in the exemplary embodiment shown. The slots 20 are separated from one another by inter-slot spaces 22. In the exemplary embodiment shown, the inter-slot spaces are the same size as the slots. However, this feature is not obligatory and, in an alternative embodiment, the slots could be smaller or larger than the inter-slot spaces.

Shown in the left-hand part of FIG. 1 is the wall 26 of the nose cone to be deiced. The wall 26 is lined with a wall 28. Thus, the walls 26 and 28 define between them a space 29 for circulation of the oil. A feed tube 30 is fastened to one end of the nose cone 26, whereas its other end, bounded by a projection 38, is centered inside the low-pressure shaft 12. A seal 36 provides the sealing between this end and the low-pressure shaft.

At its end centered in the low-pressure shaft, the tube 30 has a projection 38 which has the function, to which we will return later, of creating a thick oil film inside the feed tube 30.

The oil circulation passage 29 has a first end 40 in communication with the feed tube 30. This first end is located very close to the rotation axis Z-Z of the low-pressure shaft. The oil circulation passage 29 has a second end 42 located radially toward the outside at a larger distance from the Z-Z axis. The nose cone wall to be deiced extends between the ends 40 and 42 of the oil circulation passage 29. Radial oil return tubes 44 start from the end 42 and allow the oil to be brought to the inner race 4 of the bearing 2. Moreover, a centrifugal oil recovery scoop 48 is provided between the inner race 4 of the bearing 2 and the low-pressure shaft. This centrifugal scoop 48 is perforated by holes 50, which allow the bearing to be fed with oil. As may be seen in FIG. 1, the centrifugal scoop 48 is extended toward the right (according to FIG. 1) so as to cover the largest part of the slot 20.

The feed tube 30 is fed with oil when one of the nozzles, for example the nozzle 16 in the position shown in FIG. 1, is located facing a slot 20. At this moment the nozzle 16 delivers a jet 52 that passes through the slot 20 toward the nose cone, passes over the top of the projection 38 and travels inside the feed tube 30 until reaching and passing beyond the ZZ axis of the tube 30, forming a thick oil film 54 on the inner wall of the feed tube 30. Thanks to the projection 38, the oil then penetrates the passage 29 via the end 40, travels along the nose cone wall to be deiced from the end 40 to the end 42, and emerges via the radial oil-return tubes 44 before lubricating the bearing by passing through the centrifugal scoop and the inner race of the bearing via the feed channels 50. It should be pointed out that in this circulation the oil is driven by the centrifugal force. This is because the internal radius r of the feed tube 30 is smaller than the distance R that separates the Z-Z axis from the point of entry of the radial tubes 44 for returning the oil to the bearing 2. Thus, it may be seen that the oil has two separate functions. Firstly it serves to deice the nose cone and secondly it has the function of lubricating and cooling the bearing 2.

When, unlike the previous case, one of the nozzles lies facing an inter-slot space, the oil jet 52 is reflected by the outer surface of this inter-slot space so as to be picked up by the centrifugal scoop 48 and then directed, under the effect of the centrifugal force, toward the feed channels 50 so as to lubricate and cool the bearing 2. It may be seen that, in this case, the oil exerts only a single function, namely the lubrication of the bearing, without contributing to deicing the nose cone.

FIG. 2 shows a preferred embodiment of the arrangement of slots 20 and inter-slot spaces 22. In this particular embodiment, there are four slots 20 and four inter-slot spaces 22. The inter-slot spaces are the same size as the slots, in such a way that the angle between the center of the slots and that of the inter-slot spaces is equal to 45°. Moreover, the two nozzles 16 and 18 located on the outside of the compressor shaft have been provided so as to ensure continuity of flow, both as regards deicing the front wall of the nose cone and supplying oil directly to the bearing 2. The arrow 58 indicates the rotation direction of the low-pressure compressor shaft 12. As may be seen in FIG. 2, one of the nozzles (the nozzle 16 in FIG. 2) has arrived at a point facing the inter-slot space 22 at the moment when another nozzle (the nozzle 18 in FIG. 2) arrives at a point facing a slot 20. When the nozzle 16 has completed its travel over the inter-slot space 22, the nozzle 18 has completed its travel over the slot 20, and the roles of the two nozzles are then reversed. It is then the turn of the nozzle 16 to be at a point facing the slot, while it is the turn of the nozzle 18 to be at a point facing an inter-slot space 20. In this way, there is always a continuous feed both of the feed tube fastened to the nose cone, and therefore to the wall of the nose cone to be deiced, and the direct feed of the bearing 2 with lubricating oil. Thus, it may be seen that all of the oil lubricates the bearing 2, whereas only half the amount of oil delivered by the nozzles 16 and 18 is used for deicing the nose cone wall. Of course, this proportion is given solely by way of example and it goes without saying that, in alternative embodiments, a larger or smaller percentage of oil than 50% may be used for deicing the nose cone.

Figure 3:
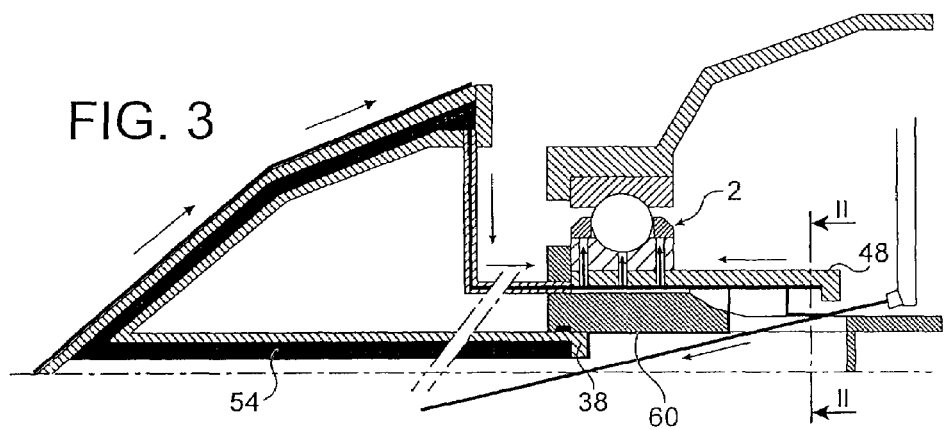
FIG. 3 is a schematic view similar to FIG. 1 but illustrating the state of the device should the flow rate be less than the flow rate of a nozzle.

In principle, the cross section of the oil passage 29 and the diameter and number of the radial oil-return tubes 44 must be capable of taking the flow of a nozzle. However, it is conceivable, under particular operating conditions, for example should the viscosity of the oil be high owing to very low temperatures, for this capacity to be reduced. In this case, as shown in FIG. 3, the oil film 54 increases in thickness until it reaches the height of the projection 38, spills over this projection, flows away as a film 60, which returns to the centrifugal scoop 48, and finally lubricates the bearing 2 directly. In these particular circumstances, despite the lower fraction of oil used for deicing the nose cone, all of the oil is again used to lubricate the bearing.

The invention claimed is:

1. A system for deicing the nose cone of an aircraft turbojet, said turbojet having a bearing which supports, in rotation and in thrust, a hollow low pressure compressor shaft of axis Z-Z of the engine, said low-pressure compressor shaft having slots and inter-slot spaces, two slots being separated by an inter-slot space, said bearing being lubricated with oil by two nozzles located outside the compressor shaft, said system comprises:
- a feed tube fastened to the nose cone of the engine, said feed tube connecting the low-pressure compressor shaft to the engine nose cone and having a radius r;
- a skin lining the wall of the engine nose cone, leaving a passage for circulation of the oil;
- a plurality of radial oil-return tubes placed between the most eccentric part of the skin relative to the Z-Z axis and the bearing, for returning the oil to the bearing; and
- a centrifugal oil recovery scoop provided between the bearing and the low-pressure shaft,
- wherein, when one of said nozzles faces one of said slots, oil passes through said slot toward said nose cone,
- wherein, when one of said nozzles faces one of said inter-slot spaces, oil is reflected by said inter-slot space and picked up by the centrifugal scoop and directed under effect of a centrifugal force toward channels for lubricating said bearing, and
- wherein a return of the oil into the bearing is located at a distance R from the Z-Z axis larger the radius r of the feed tube.

2. A system for deicing the nose cone of an aircraft turbojet, said turbojet having a bearing which supports, in rotation and in thrust, a hollow low pressure compressor shaft of axis Z-Z of the engine, said bearing being lubricated with oil by two nozzles located outside the compressor shaft, said system comprises:
- a feed tube fastened to the nose cone of the engine, said feed tube connecting the low-pressure compressor shaft to the engine nose cone and having a radius r;
- a skin lining the wall of the engine nose cone, leaving a passage for circulation of the oil;
- a plurality of radial oil-return tubes placed between the most eccentric part of the skin relative to the Z-Z axis and the bearing, for returning the oil to the bearing; and
- wherein a return of the oil into the bearing is located at a distance R from the Z-Z axis larger than the radius r of the feed tube, and
- wherein the low-pressure compressor shaft has an even number of slots separated by an even number of inter-slot spaces, the nozzles being directed toward the slots and toward the nose cone so that the oil jet from the nozzles can pass through them, the nozzles being placed relative to these slots in such a way that one of the nozzles starts to eject oil into a slot at the moment when the jet from the other nozzle starts to be reflected by an inter-slot space.

3. The deicing system as claimed in claim 2, wherein angles of inclination of the nozzles relative to the Z-Z axis of the low-pressure compressor shaft is between 5° and 30°.

4. The deicing system as claimed in claim 3, wherein the feed tube has a conicity of between 0° and 2°, the largest-diameter portion of the cone being located on the engine nose cone side.

5. The deicing system as claimed in claim 4, wherein the feed tube includes a projection in its part located toward the low-pressure compressor shaft.

6. The system as claimed in claim 5, which includes a centrifugal scoop for recovering oil that has been reflected by the inter-slot spaces of the low-pressure shaft and to direct this oil toward the bearing.

7. The deicing system as claimed in claim 6, wherein, should a flow rate of oil in the passage for oil circulation be less than a flow rate from a nozzle, the oil spills over the projection and rejoins the centrifugal scoop under the effect of the centrifugal force.

8. An aircraft turbojet, comprising a system for deicing according to claim 2.

* * * * *